July 2, 1957 R. C. TRESEDER 2,797,708
ACCUMULATOR
Filed June 2, 1953
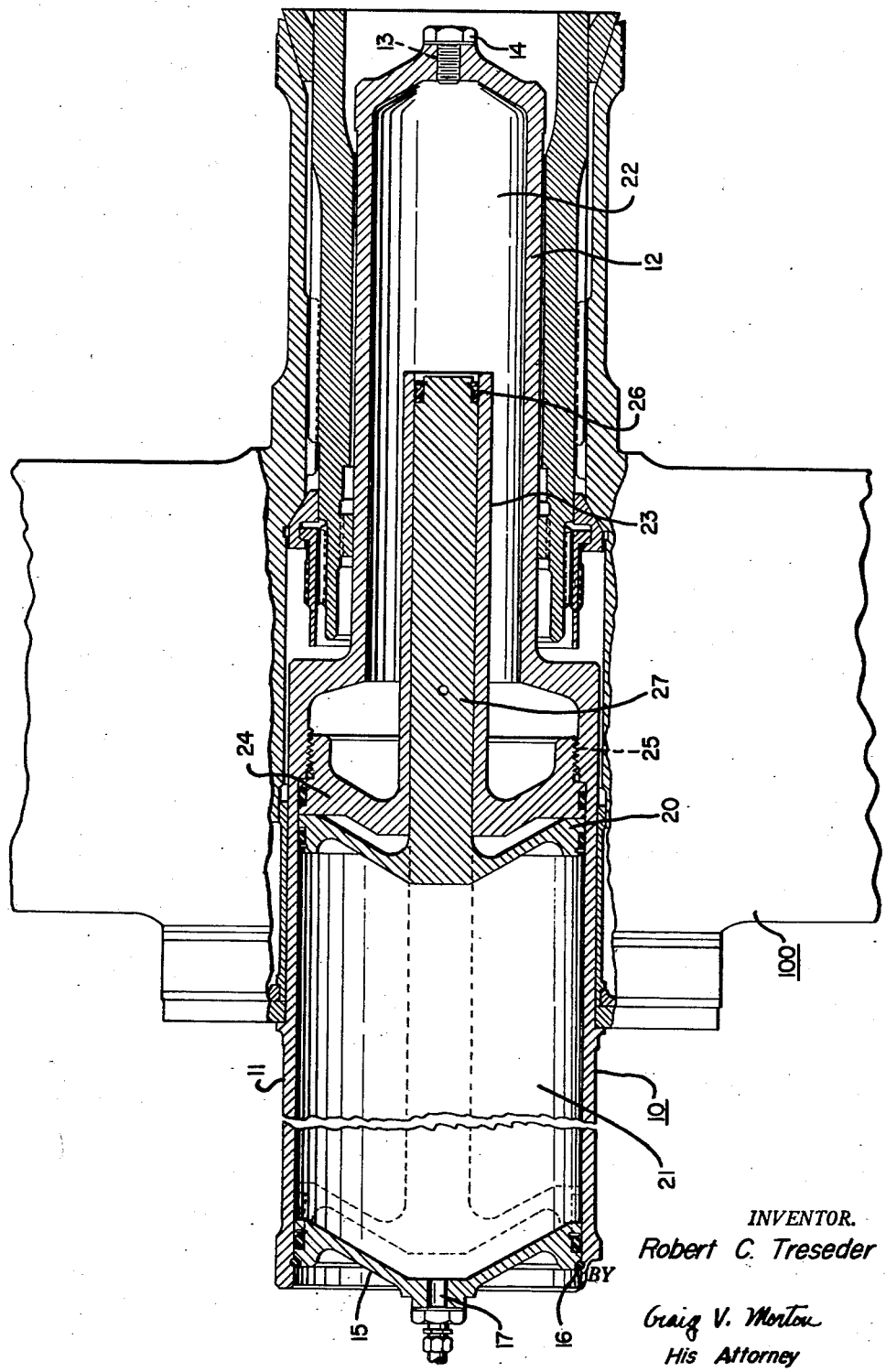
INVENTOR.
Robert C. Treseder
Craig V. Morton
His Attorney United States Patent Office 2,797,708
Patented July 2, 1957

2,797,708

ACCUMULATOR

Robert C. Treseder, Dayton, Ohio, assignor to General Motors Corporation, Detroit, Mich., a corporation of Delaware Application June 2, 1953, Serial No. 359,120

5 Claims. (Cl. 138—31)

The present invention pertains to pressure storage devices, and more particularly to an accumulator for storing hydraulic fluid under pressure.

Heretofore, hydraulic accumulators have employed preloaded gas in the charging chamber, which was separated from the liquid, or storage chamber, by either a flexible diaphragm or a movable piston. In accumulators of this type difficulty has been encountered inasmuch as the possibility of leakage between the two chambers is always present. The intermingling of hydraulic fluid and gas is of major consequence in that if the hydraulic fluid absorbs a sufficient quantity of gas, the hydraulic fluid may be rendered unsatisfactory for use in a servo system. However, an accumulator wherein the charging chamber and the storage chamber contain the same hydraulic fluid would obviate this difficulty. Accordingly, among my objects are the provision of an all hydraulic accumulator, and the further provision of an accumulator wherein the charging fluid is not under an initial preload pressure.

The aforementioned and other objects are accomplished in the present invention by taking advantage of the phenomenon of liquid compressibility under high pressure loading. Specifically, the accumulator comprises a cylinder having a stepped bore. A large reciprocable piston, disposed within the larger diameter portion of the bore, constitutes a partition within the cylinder to form a pressure storage chamber and a charging chamber. A stationary abutment member is also disposed within the larger diameter portion of the cylinder, the abutment member having an integral longitudinally extending sleeve portion, which constitutes a cylinder, or a guide, for the rod of the large piston. In effect, the rod of the large piston constitutes a smaller piston, which sealingly engages the walls of the sleeve. Opposite ends of the cylinder are provided with openings communicating respectively with the pressure storage chamber and the charging chamber.

To place the accumulator in condition for use, it is first necessary to fill the charging chamber with hydraulic fluid while the large piston is fully extended so as to reduce the volume of the storage chamber to a minimum. It is to be noted that the hydraulic fluid in the charging chamber is not under any initial preload pressure, as when the large piston is fully extended, the pressure in the charging chamber is substantially nil. After the charging chamber is filled with fluid, the opening of the cylinder communicating with the charging chamber is sealed and the accumulator is ready for use as a pressure storage device.

When hydraulic fluid under pressure is admitted to the storage chamber through the cylinder opening communicating therewith, the larger piston will be moved to a retracted position resulting in pressure loading of the hydraulic fluid in the charging chamber. If the pressure potential of fluid admitted to the storage chamber is high enough, the larger piston will be moved against the abutment thereby increasing the volume of the pressure storage chamber to a maximum. The larger piston in moving from its fully extended to its fully retracted position will result in compression of the oil in the charging chamber due to pressure loading, which will, in turn, cause expansion of the walls of the charging chamber so that when the pressure storage chamber is of the maximum volume, the product of the unit area pressure and the area of the larger piston will equal the product of the unit area pressure in the charging chamber and the area of the smaller piston.

Further objects and advantages of the present invention will be apparent from the following description, reference being had to the accompanying drawing wherein a preferred embodiment of the present invention is clearly shown, and wherein the drawing represents a fragmentary longitudinal view of an accumulator constructed according to this invention, the accumulator being shown attached to a propeller hub.

With particular reference to the drawing, an accumulator is shown comprising a cylinder 10, which is attached to and rotatable with a propeller hub, indicated generally by the numeral 100. The accumulator cylinder 10 includes a larger diameter portion 11 and an integral smaller diameter portion 12. The end of the smaller diameter portion 12 is integral with the cylinder and has formed therein a central opening 13, which may be closed by a plug 14, as shown in the drawing. The end of the larger diameter of the cylinder portion 11 is closed by a head member 15, which is retained in position by a snap ring 16 situated in an interior annular groove of the cylinder wall. The head 15 is likewise provided with a centrally disposed opening 17, that is provided with a fixture to enable its connection with a conduit, not shown.

A reciprocable piston 20 is disposed in the larger diameter cylinder portion 11, and constitutes a partition which separates the larger end diameter portions of the cylinder to form a pressure storage chamber 21 and a charging chamber 22. The piston 20, sealingly engages the cylinder walls, and includes an integral, longitudinally extending, concentrically disposed rod portion 27, which sealingly engages an integral, concentrically disposed hollow sleeve 23 forming part of an abutment member 24, which is threadingly connected at 25 to the cylinder 10. The rod portion 27 of the large piston 20, in effect, constitutes a small piston disposed for movement within the sleeve, or guide, 23 and sealingly engaging the walls thereof at 26.

As hereinbefore alluded to, the compressibility of liquids, such as oil, is well known. Moreover, the expansion of metallic cylinders under high pressure loading is also well known. This invention utilizes both of these phenomena in order to provide an all hydraulic accumulator. The accumulator operates on a principle similar to that of an hydraulic ram inasmuch as the area of piston 20 is appreciably greater than the area of rod 27, for instance, on the order of 18:1. Accordingly, when the piston 20 is in the position shown in full lines in the drawing, the pressure potential of the hydraulic medium in charging chamber 22 will be approximately eighteen times the pressure potential existent in storage chamber 21. Moreover, inasmuch as it is intended to employ the same fluid in both chambers of the accumulator, the problem of intermingling of the fluids is of no consequence.

In order to place the accumulator in condition for use, it is first necessary to remove the plug 14 and fill the charging chamber with hydraulic fluid. It is to be understood that the hydraulic fluid in the charging chamber 22 is not under pressure when the piston 20 is fully extended, as shown in the dotted line position in the drawing. When the piston 20 is fully extended, the volume of the charging chamber 22 is at a maximum and the volume of storage chamber 21 is at a minimum. When the charging chamber is full of fluid with the piston 20 fully extended, the plug 14 is replaced and the accumulator is in condition to function as a pressure storage device.

When pressure fluid is admitted through opening 17 into the storage chamber 21, the free piston 20 will assume a position between its fully extended and retracted position of the drawing wherein the product of the unit area pressure in chamber 21 and the area of piston 20 is equal to the product of the unit area pressure in chamber 22 and the area of rod 27. The reduced volume of chamber 22 caused by movement of the rod 27 to the right will be taken up partly by compression of hydraulic fluid and partly by expansion of the cylinder walls surrounding the chamber 22. When the piston 20 is in the fully retracted position, the storage chamber is at a maximum volume and the charging chamber is at a minimum volume. Under these conditions, the pressure potential existent in the storage chamber will be approximately 1000 p. s. i. and the pressure potential existent in the charging chamber will be approximately 18,000 p. s. i.

It has been noted from experiments that hydraulic fluid, such as oil, may be compressed as much as 1% by a pressure loading of 1000 p. s. i. Moreover, it has been found that volume changes due to pressure loading of oil are substantially linear. Accordingly, the reduction in volume of the charging chamber 22 caused by movement of the large piston 20 and the small piston 27 from its fully extended position to its fully retracted position can for all practical purposes be compensated for by the compression of the hydraulic fluid within the charging chamber 22.

After the storage chamber has been filled with hydraulic fluid under pressure, the stored pressure fluid may be used to actuate servo mechanism inasmuch as if the opening 17 of the head member 16 is connected to a servo device so as to partially relieve the pressure in storage chamber 21, the pressure in charging chamber 22 acting on piston rod 27 will move the piston 20 toward the fully extended position, thereby retaining the remaining fluid in the storage chamber under pressure loading.

From the foregoing it is apparent that the present invention provides an accumulator structure wherein it is not necessary to initially preload the fluid in the charging chamber. Moreover, by employing the same fluid in both the charging and storage chambers, the leakage of fluid from one chamber to the other will be of no consequence.

While the embodiment of the present invention as herein disclosed, constitutes a preferred form, it is to be understood that other forms might be adopted.

What is claimed is as follows:

1. An accumulator operable partly by reason of the compressibility of hydraulic fluid and partly by expansion of cylinder walls, comprising, a cylinder having a gas-free charging chamber portion completely sealed off at all times filled with a fixed volume of compressible hydraulic fluid free of initial preload pressure and having a pressure storage chamber portion with an opening permitting communication into and out of said cylinder, piston means freely reciprocable in said cylinder and including a first portion forming one end of the pressure storage chamber as well as a second portion having a small area cooperable with the volume of hydraulic fluid in the sealed-off charging chamber, said piston means being movable to compress the hydraulic fluid in the charging chamber and expand said cylinder through the fluid to create pressure loading of the pressure storage chamber, and means including an abutment attached to said cylinder cooperating with the second portion of said piston means in forming the charging chamber with said cylinder.

2. An accumulator, comprising, a cylinder having expansible walls with one end completely sealed off at all times filled with a fixed volume of compressible hydraulic fluid free of initial preload pressure in a gas-free charging chamber, the other end of said cylinder having an opening permitting communication into and out of a pressure storage chamber, piston means freely reciprocable in said cylinder and including a first portion forming one end of the pressure storage chamber while engaging the inner periphery of the cylinder walls, said piston means including a second portion having less cross-sectional area than the first portion and having a smaller end surface area compared with the overall cross-sectional area of the charging chamber, the second portion of said piston means cooperating with the fixed volume of fluid in the charging chamber so that reduction of volume of the charging chamber upon increase of volume in the pressure storage chamber is taken up partly by compression of hydraulic fluid and partly by expansion of the cylinder walls surrounding the charging chamber to pressure load the pressure storage chamber, and means including an abutment attached to said cylinder cooperating with said piston means in forming the charging chamber with the expansible walls of the cylinder.

3. An all hydraulic accumulator, comprising, a cylinder having expansible walls including a larger diameter portion and a smaller diameter portion, an annular abutment member attached to said larger diameter portion adjacent said smaller diameter portion, a hollow sleeve portion attached to said member and extending concentrically into said smaller diameter portion, a free piston reciprocally disposed in said cylinder, means constituting a smaller piston interconnected with said free piston and movable therewith in sealing engagement with said hollow sleeve portion, said free piston and said means constituting a smaller piston dividing said cylinder into a pressure storage chamber within said larger diameter portion and a charging chamber with said smaller diameter portion, the charging chamber being filled with a volume of compressible hydraulic fluid, said large diameter portion having an opening permitting hydraulic fluid to be urged into and out of the pressure storage chamber with longitudinal movement of said free piston and smaller piston relative to said cylinder, and means completely sealing off the small diameter portion at all times to retain a fixed amount of hydraulic fluid in the charging chamber under conditions ranging from a pressure-free state of the fluid in the charging chamber to a compressed state of the fluid variable to a degree depending upon the amount of fluid in the pressure storage chamber thus, pressure loading fluid in the pressure storage chamber by compression of hydraulic fluid in the charging chamber resulting in expansion of the cylinder walls.

4. An all hydraulic accumulator operable partly by reason of the compressibility of hydraulic fluid and partly by expansion of cylinder walls, comprising, a cylinder having a charging chamber portion completely sealed off at all times retaining a fixed amount of hydraulic fluid and having a pressure storage chamber portion with an opening capable of permitting hydraulic fluid to be moved into and out of said cylinder, an annular abutment attached to said cylinder forming the charging chamber with said cylinder, a guide means attached to said abutment and extending concentrically within the charging chamber, a first piston freely movable in a reciprocating movement in said cylinder at one side of said abutment, said first piston forming one end of the pressure storage chamber, and a second piston attached to said first piston and movable therewith, said second piston being slidable in said concentric guide means and having a small area cooperable with the fluid in the sealed-off charging chamber to compress the hydraulic fluid therein and expand said cylinder through the fluid to create pressure loading of fluid in the pressure storage chamber.

5. An accumulator, comprising, a cylinder having one end completely sealed off and an opening at the opposite end for permitting hydraulic fluid flow into and out of said cylinder, an annular abutment member having a central longitudinally extending aperture attached to said cylinder intermediate the ends thereof, a hollow sleeve attached to said abutment member providing an extension of the longitudinally extending central aperture, said hollow sleeve being spaced concentrically within said cylinder and extending toward the sealed-off end thereof, a piston in sealing engagement with said cylinder reciprocally disposed therein between said abutment member and the end of said cylinder having the opening, and a rod portion attached to said piston and reciprocal therewith, said rod portion being sealingly engaged with and slidable in said hollow sleeve, an end surface of said rod portion together with said hollow sleeve and one side of said abutment member forming a charging chamber with said cylinder in conjunction with the sealed-off end thereof, said piston forming a pressure storage chamber with said cylinder in conjunction with the end having an opening therein, said cylinder being filled with a hydraulic fluid in both the charging and the pressure storage chambers so that said rod portion is reciprocable to compress the fluid entrapped in the sealed off end of the accumulator, the hydraulic fluid in the charging chamber being freed of loading compresion when said piston and rod portion are moved toward the end of said cylinder having the opening through which said piston forces hydraulic fluid from the pressure storage chamber, the charging chamber and the pressure storage chamber containing the same type hydraulic fluid to obviate undesirable intermingling of dissimilar fluids should leakage occur between the two chambers where said piston and rod portion sealingly engage said cylinder and said hollow sleeve respectively.

References Cited in the file of this patent

UNITED STATES PATENTS

| | | |
|---|---|---|
| 228,771 | Meier | June 15, 1880 |
| 265,229 | Hyatt | Sept. 26, 1882 |
| 273,044 | Edson | Feb. 27, 1883 |
| 2,391,699 | Haines et al. | Dec. 25, 1945 |
| 2,502,041 | Geyer et al. | Mar. 28, 1950 |
| 2,612,958 | Richardson | Oct. 7, 1952 |
| 2,714,899 | Kane | Aug. 9, 1955 |